United States Patent
Toda et al.

Patent Number: 5,849,679
Date of Patent: Dec. 15, 1998

[54] NON-IONIC SURFACTANTS, EMULSIFIED COMPOSITIONS, DISPERSIONS AND A PROCESS FOR THE PREPARATION OF GLYCOSIDE COMPOUNDS

[75] Inventors: Haruhiko Toda, Tokyo; Hiroshi Miyake, Funabashi; Kazuhiko Matsuda, Tokyo; Masahiro Sato, Narashino, all of Japan

[73] Assignee: Lion Corporation, Japan

[21] Appl. No.: 663,252

[22] PCT Filed: Oct. 16, 1995

[86] PCT No.: PCT/JP95/02117

§ 371 Date: Jun. 13, 1996

§ 102(e) Date: Jun. 13, 1996

[87] PCT Pub. No.: WO96/11741

PCT Pub. Date: Apr. 25, 1996

[30] Foreign Application Priority Data

| Oct. 17, 1994 | [JP] | Japan | 6-277067 |
| Oct. 25, 1994 | [JP] | Japan | 6-284247 |
| Oct. 25, 1994 | [JP] | Japan | 6-284249 |
| Dec. 29, 1994 | [JP] | Japan | 6-340246 |
| Dec. 29, 1994 | [JP] | Japan | 6-340247 |

[51] Int. Cl.$^6$ .................................................. C11D 17/00
[52] U.S. Cl. .......................... 510/119; 510/137; 510/151; 510/152; 510/470; 514/844; 536/4.1; 536/18.3; 536/18.6
[58] Field of Search ................. 536/4.1, 18.3, 536/18.6; 510/119, 137, 151, 152, 470; 514/844

[56] References Cited

U.S. PATENT DOCUMENTS 5,385,685   1/1995   Humphreys et al. ................... 510/119

FOREIGN PATENT DOCUMENTS

| 0550280 | 7/1993 | European Pat. Off. . |
| 64-67237 | 3/1989 | Japan . |
| 454192 | 2/1992 | Japan . |
| 5229923 | 9/1993 | Japan . |

*Primary Examiner*—Richard L. Raymond
*Attorney, Agent, or Firm*—Lorusso & Loud

[57] ABSTRACT

A non-ionic surfactant represented by the general formula (1) or (2) shown below, an emulsified composition and a dispersion containing same are disclosed. Also disclosed is a method of preparing glycoside compound having nonionic surface active properties. The nonionic surfactant has good safety to human bodies and is excellent in producing foam with good feeling in touch.

General formula [1]:

$$[Z(OH)_{q-1}] \text{—} O[C_3H_5(OH)O] \text{—} R^1 \qquad [1]$$

wherein $[Z(OH)_{q-1}]$ stands for a saccharide residue excluding the hydroxyl group connected to the carbon atom in anomeric position among q hydroxyl groups connected to the saccharide compound of the formula $[Z(OH)_q]$, $-O[C_3H_5(OH)O]-$ for a glycerol residue excluding 2 hydrogen atoms from glycerol $HO[C_3H_5(OH)O]-H$, and $R^1$ for an aliphatic group having 1–12 carbon atoms, General formula [2]:

$$[Z(OH)_{q-1}] \text{—} O[C_3H_5(OH)O]_x \text{—} R^2 \qquad [2]$$

wherein $[Z(OH)]_{q-1}$ stands for a saccharide residue excluding the hydroxyl groups connected to the carbon atom in anomeric position among q hydroxyl groups connected to the saccharide compound of the formula $[Z(OH)_q]$, $-O[C_3H_5(OH)O]_x-$ for a glycerol residue excluding 2 hydrogen atoms from polyglycerol $HO[C_3H_5(OH)O]_x-H$ ($1<x\leq 7$, and $R^2$ for an aliphatic group having 13–22 carbon atoms.

8 Claims, No Drawings

NON-IONIC SURFACTANTS, EMULSIFIED COMPOSITIONS, DISPERSIONS AND A PROCESS FOR THE PREPARATION OF GLYCOSIDE COMPOUNDS

This application is a 371 of PCT/JP95/02117, filed Oct, 16, 1995.

TECHNICAL FIELD

This invention relates to non-ionic surfactants, emulsified compositions, dispersions and a process for the preparation of glycoside compounds possessing surface activity.

BACKGROUND ART

In general, non-ionic surfactants are known to be excellent in mild property to skin and safety and are widely utilized as a foaming agent for tooth cream, a detergent for kitchen, and cosmetics such as skin care or hair care.

A number of substances, for example, an alkylene oxide adduct such as an ethylene or propylene oxide adduct of a higher alcohol, a glycerol fatty acid ester and a polyglycerol fatty acid ester, sugar alcohol esters such as a sorbitan fatty acid ester, and oligosugar esters such as a sucrose fatty acid ester and a maltose fatty acid ester are known as non-ionic surfactants.

These non-ionic surfactants respectively possess a variety of characteristics; for example, they are excellent in solubilizing oils like an ethylene oxide or propylene oxide adduct of higher alcohols, or they are excellent in emulsifying power like as a sucrose fatty acid ester or a glycerol ester. However, non-ionic surfactants are generally poor in foaming power so that they are significantly inferior to anionic surfactants such as sodium laurylsulfate for use in products where good foaming is demanded such as a foamant for tooth cream, a detergent for kitchen, and cosmetics for skin care and hair care. It is therefore a current status that they cannot be used singly and are improved in foaming power by using various additives or other surfactants jointly.

On the other hand, various glycosides are known as a non-ionic surfactant which is high in safety for human body (e.g. Japanese Laid-open Patent Applns. Nos. Sho.60-204794, Hei.4-244094 and 6-145188).

However, these glycosides have a defect that they are inferior in foaming power like the aforesaid non-ionic surfactants and moreover they are poor in foaming stability.

Further, these glycosides are not satisfactory in aspects of emulsifying ability for oils and dispersing ability for solid particles.

The subjects of the present invention aimed at are as follows:

(1) To provide a non-ionic surfactant which is high in safety to human body and is excellent in foaming power and foam stability, (2) To provide an emulsified composition which is high in safety to human body and is excellent in emulsifying power for oils and in emulsion stability, (3) To provide a dispersion which is high in safety to human body and excellent in dispersibility of fine solid particles and in dispersing stability, and (4) To provide an industrially advantageous process for the preparation of glycoside which is excellent in surface activity.

Other subjects of the present invention will become apparent more fully from the following descriptions.

DISCLOSURE OF THE INVENTION

As a result of extensive researches to solve the aforementioned subjects, the present inventors have accomplished the present invention.

In accordance with the present invention, there is provided the following inventions:

(1) A non-ionic surfactant comprised of a glycoside compound of the following general formula [1] or [2]:

General formula [1]:

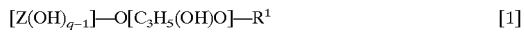

wherein $[Z(OH)_{q-1}]$ stands for a saccharide residue excluding the hydroxyl group connected to the carbon atom in anomeric position among q hydroxyl groups connected to the saccharide compound of the formula $[Z(OH)_q]$, $-O[C_3H_5(OH)O]-$ for a glycerol residue excluding 2 hydrogen atoms from glycerol $HO[C_3H_5(OH)O]-H$, and $R^1$ for an aliphatic group having 1–12 carbon atoms, General formula [2]:

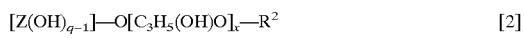

wherein $[Z(OH)_{q-1}]$ stands for a saccharide residue excluding the hydroxyl groups connected to the carbon atom in anomeric position among q hydoxyl groups connected to the saccharide compound of the formula $[Z(OH)_q]$, $-O[C_3H_5(OH)O]_x-$ for a glycerol residue excluding 2 hydrogen atoms from polyglycerol $HO[C_3H_5(OH)O]_x-H$ ($1<x\leq 7$), and $R^2$ for an aliphatic group having 13–22 carbon atoms;

(2) an oil-in-water type emulsified composition wherein an oil has been emulsified in the presence of an emulsifying agent, which comprises a glycoside compound of the above general formula [1] or [2] as the emulsifying agent;

(3) a dispersion wherein fine solid particles have been dispersed in the presence of a dispersing agent, which comprises a glycoside compound of the above general formula [1] or [2] as the dispersing agent; and (4) a process for the preparation of a glycoside compound possessing surface activity which comprises reacting a saccharide compound of the following general formula [3]:

wherein Z stands for a saccharide skeleton and q for the number of hydroxyl groups connected to the saccharide skeleton, in the presence of a solid acid catalyst with a glycerol derivative of the following general formula [4]:

wherein R stands for an aliphatic group having 1–22 carbon atoms and x for a number of 1–7; and (5) a process for the preparation of a glycoside compound possessing surface activity which comprises reacting a saccharide compound of the following general formula [3]:

wherein Z stands for a saccharide skeleton and q for the number of hydroxyl groups connected to the saccharide skeleton, in the presence of an acid catalyst and an inorganic sulfate with a glycerol derivative of the following general formula [4]:

HO[C₃H₅ (OH) O]ₓ—R  [4]

wherein R stands for an aliphatic group having 1–22 carbon atoms and x for number of 1–7.

A monosaccharide, oligosaccharide and saccharide polymerizate are included in the saccharide represented by the formula: [Z(OH)$_q$]. These saccharides will now be explained hereunder in detail.

(1) Monosaccharide:

Saccharides represented by the following general formula [5]:

$$C_nH_{2n}O_n \quad [5]$$

wherein n stands for the number of 5 or 6 can be mentioned as the monosaccharide.

Illustrative of the monosaccharide are, for example, arabinose, ribose, xylose, xylulose, ribulose, glucose, galactose, fructose, mannose, solbose, tarose, fucose, glucoheptose, sedoheptulose, mannoheptulose and glucoheptulose.

(2) Oligosaccharide:

Saccharides represented by the following formula [6]:

$$P(C_nH_{2n}O_n)\text{-}(P-1)H_2O \quad [6]$$

wherein n stands for the number of 5 or 6 and P for the number of 1–10 can be mentioned as the oligosaccharide.

Illustrative of such oligosaccharide are, for example, maltose, lactose, cellobiose, isomaltose, gentiobiose, laminalibiose, xylobiose, mannobiose, maltotriose, cellotriose, mannotriose, maltotetraose and substances obtained by hydrolyzing polysaccharides (such as cellulose, hmicellulose, starch, inulin, dextrin, dextran, xylan, etc.) to form low molecular substances.

(3) Saccharide polymerizate:

Illustrative of the saccharides polymerizate is, for example, a mannose polymerizate and a glucose polymerizate.

The glycoside compound of the above general formula [1] in the present invention is prepared by reacting a saccharide compound of the following general formula [3]:

$$[Z(OH)_q] \quad [3]$$

wherein Z stands for a saccharide skeleton excluding hydroxyl groups from the saccharide compound and (OH)$_q$ for q hydroxyl groups connected to the saccharide skeleton, with a glycerol derivative of the following general formula [7]:

HO [C₃H₅ (OH)O]—R¹  [7]

wherein R¹ stands for an aliphatic group having 1–12 carbon atoms.

The reaction in this case can be expressed by the following formula:

Z(OH)$_q$+HO[C₃H₅(OH)O]—R¹ →[Z(OH)$_{q-1}$]—O[C₃H₅(OH)O]—R¹  [8]

In the glycoside compound of the above general formula [1], the glycerol residue is derived from unpolymerized glycerol. The number of carbon atoms in the aliphatic group R¹ is 1–12, preferably 8–12 in proportion to the unpolymerized glycerol residue.

The aliphatic group R¹ includes a linear or branched, saturated or unsaturated alkyl group. Illustrative of such aliphatic group is, for example, methyl, ethyl, propyl, butyl, hexyl, octyl, decyl, undecyl, dodecyl, decenyl, dodecenyl and undecenyl.

The glycoside compound of the above general formula [2] in the present invention is prepared by reacting a saccharide compound of following general formula [3]:

$$[Z(OH)_q] \quad [3]$$

wherein Z and q have the same meanings as given above, with a glycerol derivative of the following general formula [9]:

HO[C₃H₅(OH)O]ₓ—R²  [9]

wherein R² stands for an aliphatic group having 13–22 carbon atoms and x for a number greater than 1 but not greater than 7 (1<x≦7).

In the glycoside compound of the above general formula [2], the glycerol residue is derived from a polymerized glycerol having an average polymerization degree of greater than 1 but not greater than 7 (1<x≦7), preferably between 2 and 4 (2<x≦4). The carbon atoms in the aliphatic group R² is 13–22, preferably 13–18.

The aliphatic group R² includes a linear or branched, saturated or unsaturated alkyl group. Illustrative of such aliphatic group is dodecyl, tridecyl, tetradecyl, pentadecyl, pentadecenyl, hexadecyl, octadecyl, nonadecyl, eicosyl, heneicosyl, hexadecenyl, nonadecenyl etc.

The glycoside derivatives of the above general formula [7] and [9] can be obtained by glycerol or polyglycerol with an alkylating agent such as an alkyl halide or a metal salt of an alkylsulfate.

The glycosides compound of the above general formula [1] or [2] are all well balanced with hydrophilic property due to the glycerol residue and hydrophobic property due to the aliphatic group and exhibit excellent surface active effect. The glycoside compound of the general formula [1] and the glycoside compound of the general formula [2] are preferably used singly. If these glycoside compounds [1] and [2] are mixed, a tendency of decreasing surface active effect is observed.

The glycoside compound of the above general formula [1] or [2] is preferably a stereoisomeric mixture with respect to the anomeric position thereof. The weight ratio of the α-stereoisomer in the anomeric position to the β-stereoisomer in the anomeric position is within the range of 80/20–5/95, preferably 70/30–10/90 and more preferably 60/40–50/50. If the weight ratio of the α-isomer to the β-isomer, i.e. (α/β) oversteps the above range, undesirable tendency will be observed; i.e. the foaming property of the resultant surfactant will become poor, the solubility of the surfactant will be lowered, and the feeling of foams will become bad.

The glycoside compound of the above general formulas [1]–[2] can be synthesized according to a chemical process and an enzymatic process. As the chemical process is known the so-called Fischer method [BIO INDUSTRY, 10, 408 (1993)].

The present invention involves a process for the preparation of a glycoside compound possessing surface activity which comprises reacting a saccharide compound of the following general formula [3]:

$$[Z(OH)_q] \quad [3]$$

wherein Z and q have the same meanings as given above, in the presence of a solid acid catalyst with a glycerol derivative of the following general formula [11]:

HO [C₃H₅(OH)O ]ₓ—R  [11]

where R stands for an aliphatic group having 1–22 carbon atoms and x for the number of 1–7. The glycoside compound obtained according to this process are represented by the following general formula [12]:

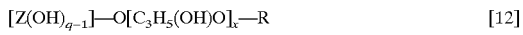
[Z(OH)$_{q-1}$]—O[C$_3$H$_5$(OH)O]$_x$—R  [12]

wherein Z, q, x and R have the same meanings as given above.

Utilized as the solid acid catalyst are ion exchangers and inorganic solid acids such as silica gel, alumina, etc.; clayish compounds such as montmorillonite, bentonite, kaolin vermiculite, zeolite etc.; mixed solid acid such as heteropolyacid-silica composite material.

Among these, acid type cationic exchangers are most preferable because of easiness in regeneration.

The acid type cationic exchangers involve those of sulfonic acid type, phosphoric acid type and carboxylic acid type. In the present invention, the use of the sulfonic acid type cationic exchangers is especially preferable. Illustrative of such cationic exchangers are, for example, Dowex (Dow Chemical), Permutit (Permutit), Duolite (Chemical Process), Nalcite (National Aluminate), Ionac (American Cyanamide), Liquonex (Liquid Conditioning), Wofatit (I. G. Farbenindustrie), Diaion (Mitsubishi Kasei), Orgatit (Yamada Chem. Labo.), Lewatite (Bayer), Acuolite (Louis Kelly), Amberlite and Amberlyst (Rohm and Haas), Anex (Institute of Synthetic Resins and Lacquers), Bio—Rex (Bio—Rex Labo.), Montecatini (Montecatini Chemical), Zerolit (Zerolit), Zeo-Karb (Permutit), Nafion (Aldrich), etc. These cationic exchangers are used in the form of powders, pellets or sheets according to the reaction mode adopted.

The reaction temperature for synthesizing the above glycoside compounds is within the range of 70°–150° C., preferably 90°–130° C. A reaction solvent such as dimethylformamide, toluene, xylene, acetonitrile, dimethylsulfoxide, dioxane, N-methylpyrrolidone, β-picoline or pyridine can be used, if necessary, for the reaction. The reaction time is within the range of 0.5–15 hours, preferably 2–10 hours.

The process of the present invention can be carried out in various types, such as a batchwise, semi-continuous or continuous mode. In case the process is carried out continuously, it is preferable to employ a reaction column wherein the solid acid catalyst is packed.

The used catalyst obtained after the reaction can be regenerated for re-use by immersing it in an aqueous acid solution or washing it with an aqueous acid solution if the solid acid catalyst is a cationic exchanger.

According to a process where the solid acid catalyst is employed, the formation of by-products is inhibited and the reaction can be carried out selectively.

The glycoside compounds of the above general formulas [1]–[2] can advantageously be prepared according to the above process.

The present invention also involves a process for the preparation of a glycoside compound possessing surface active effect, which comprises reacting a saccharide compound of the above general formula [3] in the presence of an acid catalyst and a sulfate with a glycerol derivative of the above general formula [11].

Examples of the inorganic sulfate include alkali metal sulfates, double salts including alkali metal sulfates, and ammonium sulfate. Illustrative of the inorganic sulfate are, for example, Na$_2$SO$_4$, K$_2$SO$_4$, Li$_2$SO$_4$, CaSO$_4$, MgSO$_4$, KHSO$_4$, NaHSO$_4$, K$_2$SO$_4$·Al$_2$(SO$_4$)$_3$·24H$_2$O, and K$_2$SO$_4$[Al(OH)$_6$]$_2$(SO$_4$)$_3$·12H$_2$O.

Illustrative of the acid catalysts are, for example, protonic acids such as p-toluenesulfonic acid, trifluoroacetic acid, trichloroacetic acid, methanesulfonic acid, sulfosuccinic acid, oxalic acid, acetic acid, sulfuric acid, hydrochloric acid, hydrobromic acid, phosphoric acid, and nitric acid: Lewis acids such as titanium tetrachloride, stannic tetrachloride, aluminium trichloride, ferric chloride, and boron trifluoride etherate; and other substances such as silica gel, alumina, montmorillonite, bentonite, kaolin, vermiculite, zeolite, heteropolyacid salt/silica complex and acid type ion exchangers.

The temperature for the above reaction is within the range of 60°–180° C., preferably 80°–130° C., while the reaction time is within the range of 0.5–15 hours, preferably 2–10 hours. The amount of the inorganic sulfate added is within the range of 0.1–50% by weight, preferably 1–20% by weight based on a reaction mixture comprising the saccharide compound and the glycerol derivative. In case a homogeneous acid catalyst which is soluble to the reaction mixture is used as the acid catalyst, its amount is within the range of 0.01–10% by weight, preferably 0.1–5% by weight for the reaction mixture. On the other hand, if a heterogeneous acid catalyst in the form of powders or pellets is used, its amount will be within the range of 0.05–20% by weight, preferably 0.1–10% by weight for the reaction mixture.

According to the above process wherein the inorganic sulfate is used, the glycoside compound in good color tone can be prepared.

The glycoside compounds of the above general formulas [1]–[2] can advantageously be prepared according to the above process.

Mentioned as a method for controlling the ratio of the α-isomer to the β-isomer are a method wherein a highly pure α-isomer and a highly pure β-isomer are mixed at a given ratio, a method wherein a given ratio of the β-isomer is added to a mixture of a larger proportion of the α-isomer and a smaller proportion of the β-isomer, and a method wherein a mixture comprising a lager proportion of the α-isomer is hydrolyzed in the presence of an emzyme which is able to hydrolyze the α-isomer selectively, such as α-glycosidases including, for example, α-amylase, α-glucosidase, α-galactosidase and α-mannosidase, and α-transglycosidases including, for example, α-transglucosidase and α-galactosyl-transferase, thereby hydrolyzing a given amount of the α-isomer.

The non-ionic surfactants of the present invention possess excellent foaming power and foaming stability and show good fresh foam feeling.

The non-ionic surfactants of the present invention can be used effectively for various applications where the prior art non-ionic surfactants have been used, for example, for a tooth cream (especially, enzyme-incorporated one), a foaming agent in other compositions for mouth hygiene, a main foaming ingredient for kitchen detergents, and skin care and hair care products such as shampoo, body shampoo, and facial conditioner. The non-ionic surfactants of the present invention are excellent in mild property to skin and hardly undergo protein denaturation so that they can preferably be used for liquid detergents, especially enzyme-incorporated liquid detergents, detergents for wool, etc.

The present invention involves an oil-in-water type emulsified composition wherein the glycoside compound of the above general formula [1] or [2] is used as emulsifying agent.

In the oil-in-water type emulsified composition, an oil to be emulsified in water is suitably selected according to the use purpose of the emulsified composition. Illustrative of the oil are, for example, vegetable oils such as olive oil, soybean oil, rape seed oil, peanut oil and camellia oil; animal fat and oil such as beef tallow and fish oil; and other substances such as liquid paraffin, wax, vaseline, a higher fatty acid and an ester thereof, a higher alcohol and an ester thereof. Water, an aqueous solution and a mixture of an aqueous organic solvent (e.g. an alcohol such as ethanol or glycerol) and water can be mentioned as an aqueous liquid for emulsifying oils.

No particular limitation exists in the proportion of the oil in the emulsified composition, but the proportion of the oil is within the range of 1–90% by weight, preferably 20–60% by weight. The proportion of the emulsifying agent in the emulsified composition is within the range of 0.1–20% by weight, preferably 0.1–10% by weight.

The emulsified composition of the present invention may be an ingredient of food such as dressing, whipped cream, mayonnaise and ice cream; and emulsified cosmetics such as cream and emulsions. Any conventional method can be adopted for the preparation of these emulsified products. In case the emulsified composition is to be prepared, any conventional oily ingredient and aqueous ingredient can be incorporated according to intended purpose. Other emulsifying agent may be incorporated in this case unless the object of the present invention is damaged.

The emulsified composition of the present invention is excellent in emulsifying power and emulsion stability for oils included therein. Further, the emulsifying agent included therein is a non-ionic glycoside compound so that the composition exhibits high safety to human body.

The present invention involves a dispersion of fine solid particles wherein the glycoside compound of the above general formula [1] or [2] is used as a dispersing agent.

In this dispersion, the fine solid particles to be dispersed in the dispersion medium are selected according to the intended purpose of the dispersion. Illustrative of the fine solid particles are, for example, one or more of the inorganic fine solid particles such as carbon black, titanium oxide, silicon dioxide, silicon, zeolite, diamond, calcium phosphate, calcium carbonate and zinc oxide; and organic fine solid particles such as azo dyes, phthalocyanine pigments, etc. An average particle diameter of the fine solid particles may usually be within the range of 0.1–10 μm.

The dispersion medium is also suitably selected from water, organic solvents and a mixture of water and the organic solvents. Illustrative of the dispersion medium are, for example, water, an organic solvent like a monohydric alcohol such as methanol, ethanol and butanol; a polyhydric alcohol such as propylene glycol, hexylene glycol, glycerol and polyethylene glycol; a halogenated hydrocarbon such as trichloroethylene and dichloroethane; and other organic solvents.

No particular limitation exists in the amount of the fine solid particles to be dispersed. Usually, the solid particles are used in an amount ranging from 0.1% by weight to 20% by weight, preferably from 0.5% by weight to 10% by weight based on the total dispersion. The amount of the dispersing agent used for dispersing the solid particles in the dispersion medium is within the range of 0.01–20% by weight, in particular 0.1–10% by weight.

Concrete examples of the dispersion of the present invention include a liquid detergent, a liquid mouth washer, a polishing liquid, a colloidal emulsion, a paint, a wettable ink, a wet pigment dispersion, etc. Any conventional method can be adopted for the preparation of the dispersion. In case of preparing the dispersion, proper ingredients may be incorporated according to the intended purpose. In this case, a conventionally used dispersing agent, for example, other non-ionic and anionic surfactants may optionally be incorporated, if necessary. The dispersing agent used as an auxiliary ingredient is preferably employed in an amount not more than 90% by weight based on the total dispersing agents.

The dispersion of the present invention is excellent in dispersibility and dispersion stability of the fine solid particles contained therein and shows high safety to human body since the dispersing agent contained therein is the non-ionic glycoside compound.

EXAMPLES

The invention is illustrated in more detail by the following Examples.

Reference Example 1

Glucoside compounds as shown in Table 1 were synthesized according to Fischer's method using a saccharide compound and a glycerol compound.

In Table 1, the glucoside compounds are shown in reference to the following structural formula (A):

$$[mA-(OH)_{q-1}]-O-[C_3H_5(OH)O]_x-R \qquad (A)$$

In this formula A, $[mA-(OH)_{q-1}]$ represents a saccharide residue obtained by removing the hydroxyl group attached to the anomeric carbon atom present in the saccharide compound of the formula $[mA-(OH)_q]$ (glucose(A) polymerizate having average polymerization degree of m).

The formula [13]:

$$-O-[C_3H_5(OH)O]_x-R \qquad [13]$$

represents a glycerol derivative residue obtained by removing the hydrogen atom from the glycerol derivative of the formula [14]:

$$HO-[C_3H_5(OH)O]_x-R \qquad [14].$$

Table 1 also shows the weight ratio (α/β) of an α-isomer to a β-isomer.

TABLE 1

| Product No. | [mA-(OH)$_{q-1}$]-O[C$_3$H$_5$(OH)O]$_x$-R | | | α/β wt. ratio |
|---|---|---|---|---|
| | m | x | R | |
| A | 1.5 | 1 | -C$_{12}$H$_{25}$ | 63/37 |
| B | 1.4 | 2 | -C$_{14}$H$_{29}$ | 71/29 |
| C | 1.4 | 3 | -C$_{16}$H$_{33}$ | 65/35 |
| D | 1.4 | 4 | -C$_{18}$H$_{37}$ | 68/32 |

Examples 1–4

The glucosides products Nos. A–D as obtained in Reference Example 1 were tested for the foaming ability, the emulsifiability and the dispersibility thereof, and the results obtained are shown in Table 2.

Comparative Example 1

A mixture prepared by mixing the No.A glucoside product and the No.C glucoside product, both obtained in Reference Example 1, in weight ratio of 12/8 was tested for the foaming ability, the emulsifiability and the dispersibility according to the methods as described below, and the results are shown in Table 2.

Comparative Example 2

A mixture prepared by mixing the No.B glucoside product and the No.D glucoside product, both obtained in Reference Example 1, in weight ratio of 13/7 was tested for the foaming ability, the emulsifiability and the dispersibility according to the methods as described below, and the results are shown in Table 2.

[The Measurement of the Foaming Ability]

Into an Epton tube (100 ml) was introduced 10 ml of an aqueous 0.5 wt % solution of a sample to be tested, and the solution was kept at a constant temperature of 25° C. on a water bath kept at this temperature. Then the tube was shaken 20 times in the course of 10 seconds and thereafter, the volume V(1) and V(2) of the foam was measured 30 seconds (V(1)) and 5 minutes (V(2)) after the completion of the shaking. The results are shown in Table 2.

[The Evaluation of the Foam Feeling]

A sample was dissolved in water to a concentration of 0.5% by weight, and 50 ml of the solution thus prepared was placed in a 100 ml bottle. The bottle was shaken 10 times at 40° C. and the resultant foamed solution was used to wash a face and evaluated.

○: feel refreshed

Δ: feel slightly refreshed x: feel weakly refreshed

[Determination of emulsifiability]

An aqueous 0.5 wt % solution (10 ml) of a sample was placed in a 30 ml-test tube equipped with a plug, then 10 ml of a salad oil was added. The resultant mixture was shaken vigorously 30 times at 30° C., then allowed to stand at 30° C. for 30 minutes and the amount (ml) of the aqueous phase separated in the lower part of the test tube was measured. The results are shown in Table 2.

[Determination of dispersibility]

An aqueous 0.5 wt % solution (30 ml) of a sample was placed in a 50 ml-test tube equipped with a plug, then 0.3 g of carbon black was added. The whole was shaken vigorously 30 times at 30° C., then left standing at 30° C. for 30 minutes to allow the layers to separate. Then, 1 ml pipette was inserted into the test tube to position the tip of the pipette at the distance corresponding to 1.5 ml from the bottom of the test tube and 1 ml of the test sample was taken. The test sample thus taken (1 ml) was diluted 1:50 with distilled water and treated with ultrasonic wave for 10 minutes to disperse the carbon black. After dispersion, the turbidity of the dispersion was determined using Hitachi Absorption Photometer (slit width 0.05 mm, wavelength 480 nm), and the amount of the dispersed carbon black was determined using a calibration curve which had previously been prepared.

TABLE 2

| Sample tested | Volume of foam (ml) V(1) | Volume of foam (ml) V(2) | Foam feeling | Emulsified amount (mg/mg) | Aq. Phase separated (ml) |
| --- | --- | --- | --- | --- | --- |
| Ex. 1 | A | 92 | 89 | ○ | 6 | 1 |
| Ex. 2 | B | 94 | 90 | ○ | 6 | 3 |
| Ex. 3 | C | 93 | 90 | ○ | 5 | 2 |
| Ex. 4 | D | 91 | 88 | ○ | 6 | 2 |
| Com. Ex. 1 | A/B | 58 | 55 | x~Δ | 2 | 7 |
| Com. Ex. 2 | A/D | 53 | 51 | x~Δ | 1 | 6 |

The following formulations illustrate the compositions containing non-ionic surface active agents of the present invention.

| Composition 1: Shampoo | |
| --- | --- |
| Product No.A glucoside | 10.5(wt%) |
| Lauryl ethoxysulfate ester Na-salt | 3.5 |
| Cocoyl diethanolamide | 2.0 |
| Sodium sulfate | 1.5 |
| Flavor, Dye | q.s. |
| Water | balance |
| Total | 100.0 |

| Composition 2: Dental Cream | |
| --- | --- |
| Calcium hydrogen phosphate 2H$_2$O | 45.5(wt%) |
| Glycerol | 5.0 |
| Sorbitol | 15.0 |
| Sodium carboxymethylcellulose | 1.0 |
| Product No.B glucoside | 1.5 |
| Flavor, Sweetener | q.s. |
| Water | balance |
| Total | 100.0 |

| Composition 3: Liquid Soap | |
| --- | --- |
| Oleyl tetraglyceryl polyglucoside | 20.0(wt%) |
| Lauryl sulfate ester Na-salt | 10.0 |
| Flavor, Emulsifier | q.s. |
| Water | balance |
| Total | 100.0 |

The above oleyl tetraglyceryl polyglucoside (in Formula (A) above, m=1.4, x=4, and R=oleyl) is a mixture of 60/40 α/β isomers.

| Composition 4: Detergent for Vegetables and Dishes | |
| --- | --- |
| Alcohol ethoxylate sulfate ester Na-salt | 20.0(wt%) |
| Product No.D glucoside | 10.0 |
| Lauryl alkanolamide | 5.0 |
| Flavor, Emulsifier | q.s. |
| Water | balance |
| Total | 100.0 |

| Composition 5: Cold Cream | |
| --- | --- |
| Product No.A | 10 (Parts by weight) |
| Liquid paraffin | 25 |
| Lanolin | 10 |
| Isopropyl myristate | 12 |
| Flavor, Dye | q.s. |
| Water | balance |
| Total | 100.0 |

| Composition 6: Vanishing Cream | |
| --- | --- |
| Product No.B | 5.5(wt%) |
| Stearic acid | 13.2 |
| Propylene glycol | 24.0 |
| Glycerol | 6.0 |
| Sodium hydroxide | 0.6 |
| Flavor | q.s. |
| Purified water | balance |
| Total | 100.0 |

| Composition 7: Emulsification Medium for use in Drawing metal | |
| --- | --- |
| Potassium oleate | 20 (Parts by weight) |
| Hexadecyl alcohol | 25 |
| Beef tallow | 25 |
| Borax | 50 |
| Product No.A | 25 |
| Water | 400 |

| Composition 8: Pigment Dispersion | |
| --- | --- |
| Titanium oxide (1 μm diameter) | 10 (wt %) |
| Sodium alginate | 5 |

-continued

| Product No.B | 2 |
| --- | --- |
| Water | balance |
| Total | 100.0 |

Composition 9: Liquid Detergent

| Product No.D | 13.0(wt%) |
| --- | --- |
| Sodium metasilicate | 6.0 |
| Flavor | 0.5 |
| Water | balance |
| Total | 100.0 |

Composition 10:. Detergent containing Abrasives

| Product No.A | 3.5(wt%) |
| --- | --- |
| P.O.E. Nonyl phenyl ether | 3.0 |
| Sodium benzoate | 3.5 |
| Urea | 5.0 |
| Sodium hydroxide | 1.0 |
| Silica powder (100 mesh passed) | 54.0 |
| Flavor, Dye | q.s. |
| Water | balance |
| Total | 100.0 |

Example 5

Three-necked 2-liter flask was charged with 180 g (1.0 mol) of D-glucose, 1390 g (6.0 mol) of 1-O-n-decylglycerol of the following formula [15] and 5.2 g of Dowex 50 W-X8 (Acid-form) (manufactured by Dow Chemical Co.), and the whole was heated with stirring at 130° C. for 6 hours under reduced pressure of 15 mmHg. After the reaction had been completed, the reaction mixture was allowed to cool to room temperature and the ion-exchange resin was removed off by filtration. To the filtrate, 200 ml of water was added and the layers were separated. The upper layer containing 1-O-n-decylglycerol was removed off and the aqueous layer was extracted with 300 ml of ethyl ether to remove 1-O-n-decylglycerol. Then water was distilled off from the aqueous layer to leave 374 g of a white solid. The yield was 85%.

Acetylation of an aliquot of this white solid with acetic anhydride and pyridine according to the usual method followed by gas chromatography analysis revealed that 1-O-n-decylglyceryl-D-glucopyranoside was contained in 95% purity and there were extremely little by-products present.

$$HOCH_2CH\ (OH)\ CH_2O\text{—}C_{10}H_{21} \qquad [15]$$

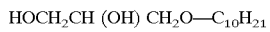

The above reaction was also found to produce 1-O-n-decylglycerylmaltoside with a yield of 10%.

Example 6

Three-necked 2-liter flask was charged with 180 g (1.0 mol) of D-glucose, 705 g (4.0 mol) of 1-O-n-hexylglycerol of the following formula [16] and 5.4 g of Amberlite IR-120B (Acid-form) (manufactured by Rohm & Haas), and the whole was heated with stirring at 120° C. for 5 hours under reduced pressure of 15 mmHg.

After the reaction had been completed, the reaction mixture was allowed to cool to room temperature and the ion-exchange resin was removed off by filtration. The filtrate was evaporated under reduced pressure, and 512 g (96% recovery) of excess 1-O-n-hexyl glyceryl ether was obtained as a distillate at 104°–107° C./0.4 mmHg. As a residue, a white solid (321 g) was obtained. Gas chromatography analysis of an aliquot of the white solid thus obtained according to conventional method revealed that it contained 1-O-n-hexylglyceryl-D-glucopyranoside in 97% purity and there were extremely little by-products present. The yield was 82%.

$$HOCH_2CH\ (OH)\ CH_2O\text{—}C_6H_{13} \qquad [16]$$

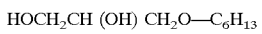

The above reaction was also found to produce 1-O-n-hexylglycerylmaltoside with a yield of 16%.

Example 7

Three-necked 100 ml-flask was charged with 1.8 g (0.01 mol) of D-glucose, 21 g (0.05 mol) of 1-O-n-dodecyltriglycerol of the following formula [17] and 0.7 g of Nafion NR-50 (Acid-form) (Aldorich Co.), and the whole was heated with stirring at 130° C. for 6 hours under reduced pressure of 15 mmHg.

After the reaction had been completed, the reaction mixture was allowed to cool to room temperature and the ion-exchange resin was removed off by filtration. The filtrate was purified by silica gel column chromatography to yield 5.2 g of 1-O-n-dodecyltriglyceryl-D-glucopyranoside as a white solid. The yield was 81%.

The excess 1-O-n-dodecyltriglyceryl ether and a small amount of unreacted glucose were recovered but there were almost no by-products detected.

$$HO\text{—}[C_3H_5(OH)O]_3\text{—}C_{12}H_{25} \qquad [17]$$

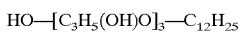

The above reaction was also found to produce 1-O-n-dodecyltriglyceryl-maltoside with a yield of 15%.

Example 8

Three-necked 100 ml-flask was charged with 1.8 g (0.01 mol) of D-glucose, 29.4 g (0.06 mol) of 1-O-oleyltriglycerol of the following formula [18], 1.2 g of activated montmorillonite KSF (manufactured by Sud-Chemie) and 30 ml of N-methylpyrrolidone, and the whole was heated with stirring at 120° C. for 6 hours under reduced pressure of 50 mmHg.

After the reaction had been completed, the reaction mixture was allowed to cool to room temperature and actinated montmorillonite was removed off by filtration. The solvent was distilled off from the filtrate and the residue was purified by silica gel column chromatography to afford 5.8 g of 1-O-oleyl triglyceryl-D-glucopyranoside as a white solid. The yield was 89%.

The excess 1-O-oleyl triglyceryl ether and a small amount of unreacted glucose were recovered but there were almost no by-products detected.

$$HO\text{—}[C_3H_5(OH)O]_3\text{—}C_{18}H_{35} \qquad [18]$$

The above reaction was also found to produce 1-O-n-oleyl triglyceryl ether maltoside with a yield of 9%.

Example 9

Three-necked 100 ml-flask was charged with 1.8 g (0.01 mol) of D-glucose, 29.3 g (0.04 mol) of stearylpolyglycerol (average polymerization degree x=6) of the following formula [19], 0.9 g of Dowex 50 W-X8 (Acid-form) (manufactured by Dow Chemical Co.) and 30 ml of dimethylformamide, and the whole was heated with stirring at 100° C. for 6 hours under reduced pressure of 35 mmHg.

After the reaction had been completed, the reaction mixture was worked up and purified in the same manner as that in Example 8, whereby 7.8 g of stearyl polyglyceryl-D-glucopyranoside were obtained with a yield of 87%.

HO—[C₃H₅(OH)O]₆—C₁₈H₃₇ [19]

The above reaction was also found to produce stearylpolyglyceryl maltoside with a yield of 8%.

Example 10

The procedure of Example 9 was repeated using 1.94 g (0.01 mol) of alpha-methyl glucoside in place of D-glucose, and the reaction mixture was worked up and purified as in Example 9 to afford 8.2 g (80% yield) of stearylpolyglyceryl-D-glucopyranoside.

Stearyl polyglyceryl-maltoside was also found to be produced with a yield of 17% in the above reaction.

Example 11

The procedure of Example 9 was repeated using 1.8 g (0.01 mol on the monosaccharide base) of soluble starch in place of D-glucose, and conducting the reaction in the normal pressure. The reaction mixture was worked up and purified as in Example 9 to afford 7.3 g (82% yield) of stearylpolyglyceryl-D-glucopyranoside.

Stearylpolyglyceryl-maltoside was also found to be produced with a yield of 11% in the above reaction.

The color tone index R as referred to in the following Examples is determined as follows:
[Determination of Color Tone Index R]

An aqueous 10 wt % solution of a test sample was prepared and the absorbance T of the solution was determined at 420 nm using a spectrophotometer. The value R was calculated from the following equation.

$$R=[-\log T] \times 1000$$

Example 12

To 4280 g (17.4 mol) of 1-O-n-decylglycerol HO[C₃H₅(OH)O]—C₁₀H₂₁ were added 5 g of sulfuric acid and 80 g of Na₂SO₄. The resultant mixture was heated with stirring at 120° C., then 600 g (3.3 mol) of glucose was added and the resultant mixture was heated with stirring at 120° C. for 4 hours under reduced pressure (40 mmHg).

After the reaction had been completed, the reaction mixture was allowed to cool to room temperature, added with 500 ml of water, neutralized with NaOH, and the layers were separated using a separatory funnel. The upper 1-n-decylglycerol layer was removed and the aqueous layer was extracted with 600 ml of ethyl ether to remove 1-O-n-decylglycerol. Thereafter, the aqueous layer was extracted with ethyl acetate and ethyl acetate was distilled off from the organic phase to yield 1304 g of almost uncolored, odorless white solid. The color tone index R of this white solid was Analysis of the above white solid by high performance liquid chromatography showed that the yield of 1-O-n-decylglyceryl-D-glucopyranoside was 72%.

Comparative Example 3

In a similar manner as in Example 12 but without using Na₂SO₄, a significantly colored product with an odor was obtained. The color tone index R of this product was 131. The yield of 1-o-n-decylglyceryl-glucoside was 32%.

Example 13

The procedure of Example 12 was repeated using 260 g (20.0 mol) of n-octanol, 6 g of sulfuric acid, 120 g of Na₂SO₄ and 600 g (3.3 mol) of glucose. After similar work up and purification, 966 g of almost uncolored and odorless white solid was obtained. The color tone index R of this white solid was 38 and the content of n-octyl-D-glucopyranoside in this white solid was 70%.

Comparative Example 4

In the same manner as that in Example 13 but without the addition of Na₂SO₄, a remarkably colored product having an odor was obtained. The color tone index R of this product was 134.

Example 14

The procedure of Example 12 was repeated using 2040 g (5.0 mol) of 1-O-n-dodecyltriglycerol OH[C₃H₅(OH)O]₃—C₁₂H₂₅, 5 g of para-toluene sulfonic acid, 100 g of Na₂SO₄ and 144 g (0.8 mol) of glucose. The reaction mixture was worked up and purified in similar manner as in Example 12, whereby 459 g of almost uncolored and odorless white solid was obtained. The color tone index R of this white solid was 39 and the content of 1-O-n-dodecyltriglyceryl-D-glucopyranoside in the white solid was 75%.

The yield of 1-O-n-dodecyltriglyceryl-maltoside was 18%.

Comparative Example 5

In the same manner as that in Example 14 but without the addition of Na₂SO₄, a remarkably colored product having an odor was obtained. The color tone index R of this product was 132.

Example 15

In the same manner as that in Example 12 but using various inorganic sulfates as indicated in Table 3 in place of Na₂SO₄, various products were obtained. The color tone index R of each of the products thus obtained are shown in Table 3.

TABLE 3

| Run No. | Inorganic sulfate | Color tone index R |
|---|---|---|
| 1 | K₂SO₄ | 37 |
| 2 | CaSO₄ | 39 |
| 3 | MgSO₄ | 36 |
| 4 | NaHSO₄ | 36 |
| 5 | Dowex50W8(Na-form) (Dow Chemical) | 38 |
| 6 | Dowex 1 × 8(SO₄Na-form) (Dow Chemical) | 37 |

We claim:

1. A non-ionic surfactant comprising an isomeric mixture of α-anomeric isomer and β-anomeric isomer of a glycoside compound of the following general formula 1 or 2:

General formula 1:

$$(Z(OH)_{q-1})-O(C_3H_5(OH)O)-R^1$$

wherein $Z(OH)_{q-1}$ is a saccharide residue obtained by removing the hydroxyl group connected to the carbon atom in anomeric position among q hydroxyl groups connected to the saccharide compound of the formula $Z(OH)_q$, $-O(C_3H_5(OH)O)-$ is a glycerol residue obtained by removing 2 hydrogen atoms from glycerol $HO(C_3H_5(OH)O)-H$, and $R^1$ is an aliphatic group having 1–12 carbon atoms, General formula 2:

$$(Z(OH)_{q-1})-O(C_3H_5(OH)O)_x-R^2$$

wherein $Z(OH)_{q-1}$ is a saccharide residue obtained by removing the hydroxyl group connected to the carbon atom in anomeric position among q hydroxyl groups connected to the saccharide compound of the formula $Z(OH)_q$, $—O(C_3H_5(OH)O)_x—$ is a glycerol residue obtained by removing 2 hydrogen atoms from polyglycerol $HO(C_3H_5(OH)O)_x—H$ wherein $1<x\leq 7$, and $R^2$ is an aliphatic group having 13–22 carbon atoms; and wherein the weight ratio of the α-isomer to the β-isomer is within the range of 80/20–5/95.

2. A surfactant according to claim 1 wherein $Z(OH)_{q-1}$ in the general formula 1 or in the general formula 2 stands for a glucose residue.

3. An oil-in-water emulsified composition comprising an oil emulsified in water and an emulsifying agent comprising a surfactant according to claim 1.

4. A dispersion wherein fine solid particles are dispersed in the presence of a dispersing agent comprising a surfactant according to claim 1.

5. A process for the preparation of an isomeric mixture of α-anomeric isomer and β-anomeric isomer of a glycoside compound possessing surface activity wherein the weight ratio of the α-isomer to the β-isomer is within the range of 80/20–5/95, said process comprising:

reacting a saccharide compound of the following general formula:

$$Z(OH)_q$$

wherein Z is a saccharide skeleton and q is the number of hydroxyl groups connected to the saccharide skeleton, in the presence of a solid acid catalyst with a glycerol derivative of the following general formula:

$$HO\,(C_3H_5(OH)O)_x—R$$

wherein $1<x\leq 7$ and wherein R is an aliphatic group having 1–12 carbon atoms when x=1 and 13–22 carbon atoms when x is 2–7.

6. A process according to claim 5, wherein the solid acid catalyst is an acid type ion exchanger.

7. A process for the preparation of an isomeric mixture of α-anomeric isomer and β-anomeric isomer of a glycoside compound possessing surface activity wherein the weight ratio of the α-isomer to the β-isomer is within the range of 80/20–5/95, said process comprising:

reacting a saccharide compound of the following general formula:

$$Z(OH)_q$$

wherein Z is a saccharide skeleton and q is the number of hydroxyl groups connected to the saccharide skeleton, in the presence of an acid catalyst and an inorganic sulfate with a glycerol derivative of the following general formula:

$$HO\,(C_3H_5(OH)O)_x—R$$

wherein $1<x\leq 7$ and wherein R is an aliphatic group having 1–12 carbon atoms when x=1 and 13–22 carbon atoms when x is 2–7.

8. A process according to claim 7, wherein the acid catalyst is an acid type ion exchanger.

* * * * *

UNITED STATES PATENT AND TRADEMARK OFFICE
CERTIFICATE OF CORRECTION

PATENT NO. : 5,849,679
DATED : December 15, 1998
INVENTOR(S) : TODA et al

It is certified that error appears in the above-indentified patent and that said Letters Patent is hereby corrected as shown below:

Title Page, under the heading "[75] Inventors": "Funabashi" should read --Chiba-ken-- and "Narashino" should read --Chiba-ken--.

Col. 4, line 20, "2<X≤4)." should read --2≤X≤4)--; and
line 47, "(α/β" should read --α/β--.

Col. 13, line 51, after "was" insert --39.--

Signed and Sealed this

Seventh Day of December, 1999

Attest:

Attesting Officer

Q. TODD DICKINSON

Acting Commissioner of Patents and Trademarks